United States Patent
Sedlacek et al.

(10) Patent No.: US 8,092,057 B2
(45) Date of Patent: Jan. 10, 2012

(54) DEVICE FOR AUTOMATIC SWITCHING OF A TOURING SHUTTER BY EXTREME TRAVEL OF THE HEIGHT ADJUSTMENT OF A HEADLIGHT

(75) Inventors: Vlastimil Sedlacek, Pribor (CZ); Jaromir Cacala, Ostrava (CZ); Petr Smajser, Novy Jicin (CZ); Michal Novy, Jr., Valasske Mezirici (CZ)

(73) Assignee: Visteon Global Technologies, Inc., Van Buren Township, MI (US)

( * ) Notice: Subject to any disclaimer, the term of this patent is extended or adjusted under 35 U.S.C. 154(b) by 376 days.

(21) Appl. No.: 12/504,891

(22) Filed: Jul. 17, 2009

(65) Prior Publication Data

US 2010/0014305 A1    Jan. 21, 2010

(30) Foreign Application Priority Data

Jul. 21, 2008   (CZ) .................................... 2008-451

(51) Int. Cl.
*F21V 21/28* (2006.01)
*B60Q 1/14* (2006.01)

(52) U.S. Cl. ......... 362/523; 362/526; 362/285; 362/418

(58) Field of Classification Search .................. 362/523, 362/538, 526, 529, 532, 537, 465, 467, 285, 362/286, 418
See application file for complete search history.

(56) References Cited

U.S. PATENT DOCUMENTS

| 3,626,174 | A | * | 12/1971 | Cranmore | 362/507 |
| 5,906,431 | A | * | 5/1999 | Chianale et al. | 362/515 |
| 5,911,502 | A | * | 6/1999 | Zillgitt et al. | 362/508 |
| 6,457,851 | B2 | * | 10/2002 | Hamm | 362/525 |
| 2002/0075693 | A1 | * | 6/2002 | Rosenhahn et al. | 362/513 |
| 2003/0039124 | A1 | * | 2/2003 | Tawa et al. | 362/464 |

* cited by examiner

*Primary Examiner* — Bao Q Truong
(74) *Attorney, Agent, or Firm* — Dickinson Wright PLLC

(57) ABSTRACT

A device for automatic switching of the touring diaphragm by an extreme travel of the height controls of the headlight is provided with a mechanism for changing the spatial distribution of the light, consisting of a projector (1), attached by fixed hinges (2) to the body of the headlight (3). The adjustable hinge (4) enables movement of the projector (1) relative to the body of the headlight (3) by means of an actuator (5), so that in the extreme position there is a collision of the two-armed lever (6) with the body (3) and its rotation on a pivot (7), resulting in a change in the shape of the light beam. A spring (8) can be used to ensure the extreme positions of the travel.

6 Claims, 3 Drawing Sheets

DEVICE FOR AUTOMATIC SWITCHING OF A TOURING SHUTTER BY EXTREME TRAVEL OF THE HEIGHT ADJUSTMENT OF A HEADLIGHT

CROSS REFERENCE TO RELATED APPLICATION

This application claims the benefit of Czech Republic Patent Application No. PV 2008-451 filed Jul. 21, 2008, entitled "Device For Automatic Switching Of A Touring Shutter By Extreme Travel Of The Height Adjustment Of A Headlight," the entire disclosure of this application being incorporated by reference.

BACKGROUND OF THE INVENTION

1. Technical Field

The invention concerns an apparatus for and a method of changing the lighting mode of a projector unit. The projector unit is outfitted with a mechanism for changing the spatial distribution of the light beam. The mechanism generally includes a modified body of the headlight with installed projector, an electric motor for the height adjustment, which is modified to enable an extremely large travel, and a touring shutter lever. The touring shutter lever is turned on or off upon extreme travel of the height control by making contact with the body of the headlight.

2. Discussion

The touring diaphragm is a commonly requested accessory for the majority of the projector units manufactured in Europe. Most of the time it involves a simple double-arm lever, located at the side of the projector and rotating about a horizontal transverse axis of the projector. One end of this double-arm lever is inserted inside the projector, where it functions to crop the light beam, and the other end the lever is grasped or pressed upon when switching the device.

Most of the levers are provided with a device (such as a spring) which constantly directs the lever against a stop in the end position and prevents it from becoming jammed in an intermediate position.

The basic drawback of the commonly used design for mechanical turning on of the touring diaphragm is generally poor accessibility to the lever of the touring diaphragm, specifically requiring lifting of the hood, removal of the cover from the body of the headlight, and typically removed of the entire headlight from the vehicle—in which case it is necessary to readjust the light after putting it back on the vehicle.

Usually when the projector is moving inside the light during the changing of the height setting there should not be any contact (or collision) between the projector and the body, except for the fastening point.

SUMMARY OF THE INVENTION

According to the present invention, a device has been developed for automatic switching of the touring diaphragm by an extreme travel of the height controls of the headlight. More specifically, a mechanism for changing the spatial distribution of the light beam, including a projector unit adjustably attached to the body of the headlight, an actuator with extremely large travel for changing the height setting, and a touring diaphragm lever rotating on a shaft are configured to delimit the emerging light beam at the top.

The lever is arranged so that in the extreme position it enters into collision with the body of the headlight and optionally a pressing spring for its rotation on a pivot to ensure a change in the shape of the light beam.

The segment known as the "touring diaphragm lever" being movably attached to the projector, enters into contact or collision with the body of the headlight in an extreme height setting of the projector, not used in routine operation, and is forced by the contact or collision with the (unyielding) body of the headlight to change its position (as when a toggle switch is pressed) to another (opposite) state, when it again takes up its original position.

It is advantageous for the turning of the segment on and off to occur by traveling to the same extreme position (as with a ballpoint pen mechanism).

To change the distribution of the light beam, one will advantageously use a segment attached to the projector and entering into collision with the body of the headlight upon extreme change in the height setting of the headlight.

Also, in the developed mechanism, there is no collision of the projector with the surrounding body of the headlight in any common height setting of the headlight, but instead the mechanism, thanks to a linear motor with large travel is distinguished by the ability to bring about a large change in the height setting of the projector in the light because the projector gets into a position ordinarily not used and not usable in regard to the body of the light, where there occurs a collision between the lever and the body of the headlight, followed by a forcing of the lever into the opposite position.

For the common arrangement of the projector in the headlight, see the sample embodiment below, upon the extreme movement of the light beam in the upward direction the touring diaphragm is switched off, and when it moves in the downward direction it is turned on. An opposite arrangement is also possible, or one in which the turning on and off of the touring diaphragm results from repeated movements of the actuator of the height adjustment to the same extreme position (in the same direction).

The invention can also be used for other changing of the light beam than to turn on the touring diaphragm, and the mechanism when used when the vehicle is moving, provided that other light sources (contributors) would also be used to cover the "dropout" of the light source moving with the mechanism to the extreme position.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
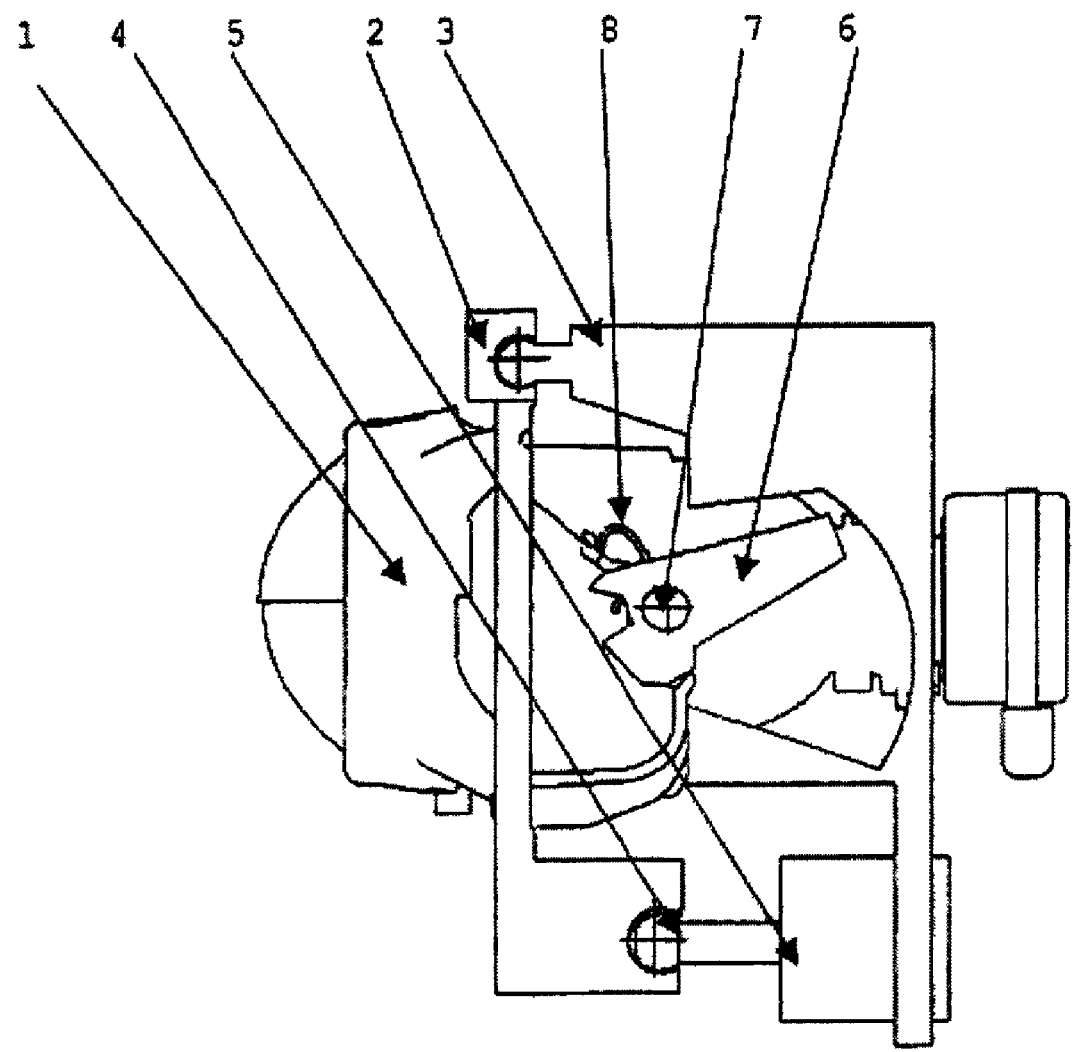
FIG. 1 shows a front view of the mechanism in the ordinary position of height adjustment, the lever (6) does not collide with the body of the headlight (3)
Figure 2:
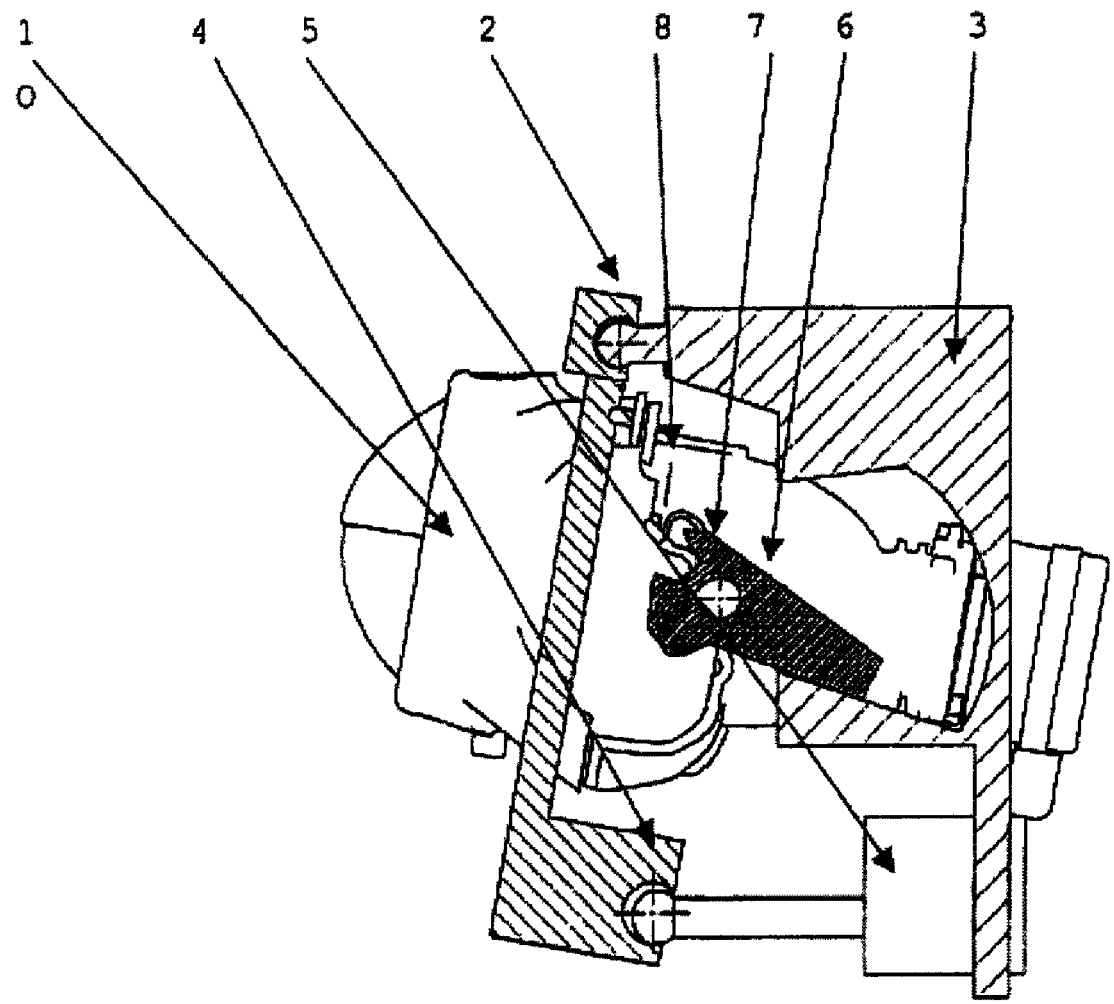
FIG. 2 shows a front view of the mechanism in the extreme upper position of the height adjustment, the lever (6) is forced by the collision with the body of the headlight (3) to move to the opposite position "turned off"
Figure 3:
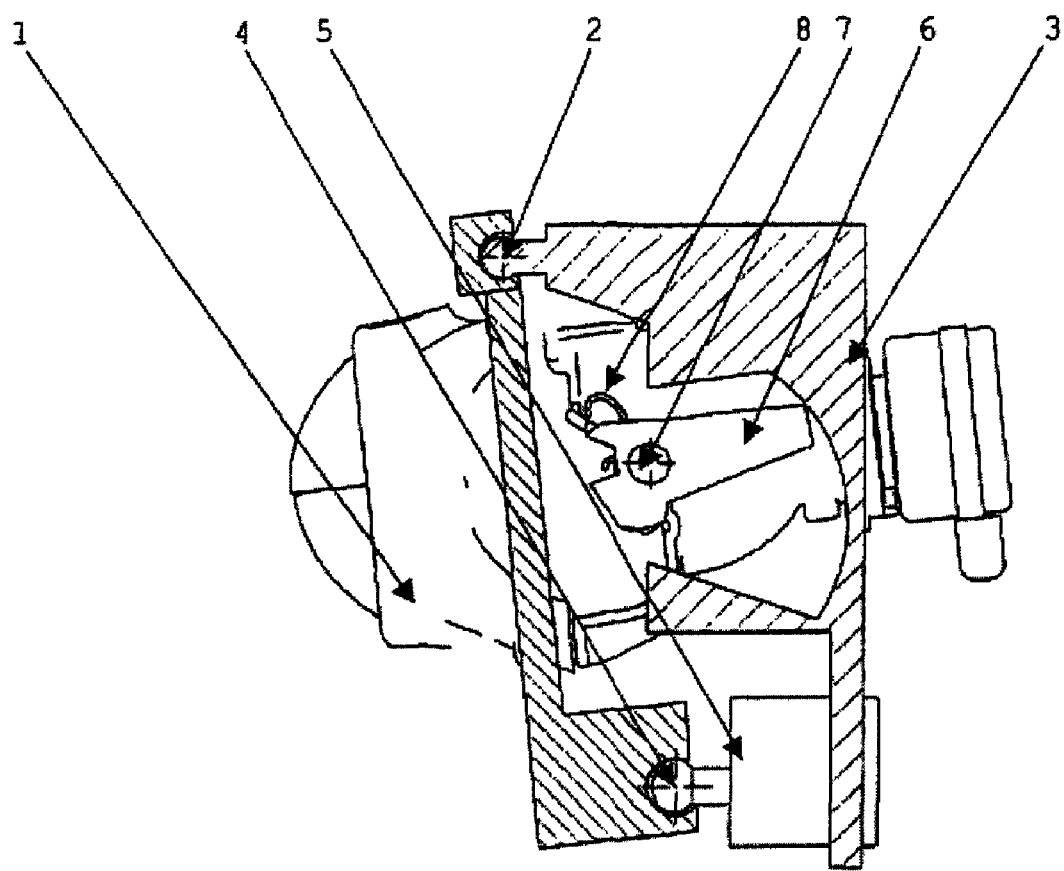
FIG. 3 shows a front view of the mechanism in the extreme lower position of the height adjustment, the lever (6) is forced by the collision with the body of the headlight (3) to move to the opposite position "turned on."

The mechanism is attached to the projector unit of the headlight 1, which is inserted by at least (usually) two non-adjustable fastening points 2 in the body of the headlight 3 or in the frame in the projector unit of the headlight 3.

Moreover, the projector 1 is fastened in the body of the headlight 3 by at least (usually) one fastener 4, adjustable by an actuator 5. This adjustable fastening 4 provides the required ability to change the height setting of the light.

The actuator 5 of the height setting is characterized by a large travel, as a result of which the entire mechanism of height adjustment is characterized by an unusually large angular travel, making possible the height adjustment of the projector 1 in addition to the usual range of adjustment to extreme upward and downward positions, unusable for normal operation.

The mechanism can be created especially by the lever 6 of the touring diaphragm, rotationally mounted on a pivot 7 at the side of the projector.

The mechanism is preferably provided with a spring 8 ensuring that the lever 6 during the switching does not stop in an undefined position during its travel (functions like a toggle switch).

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. Device for automatic switching of the touring diaphragm by an extreme travel of the height controls of the headlight, provided with a mechanism for changing the spatial distribution of the light beam, comprising:
    a projector unit (1) adjustably attached to the body of the headlight (3);
    an actuator (5) with extremely large travel for changing the height setting;
    a touring diaphragm lever (6), rotating on a shaft to delimit the emerging light beam at the top of the headlight, characterized in that the lever (6) is arranged so that in the extreme position it enters into collision with the body (3) of the headlight (2).

2. The device of claim 1 further including a pressing spring (8) to ensure a change in the shape of the light beam.

3. The device of claim 2 wherein said pressing spring is at least partially disposed between said lever and projector unit.

4. The device of claim 1, wherein said touring diaphragm lever (6) being movably attached to the projector, enters into contact with the body of the headlight in an extreme height setting of the projector, and is forced by the contact with the body of the headlight to change its position to another state, when it again takes up its original position.

5. The device of claim 1, wherein the turning on and off occurs by traveling to the same extreme position.

6. The device of claim 1, wherein said segment attached to the projector (6) and entering into collision with the body of the headlight (3) upon extreme change in the height setting of the headlight is used to change the distribution of the light beam.

* * * * *